(12) United States Patent
Doddman et al.

(10) Patent No.: US 8,911,656 B2
(45) Date of Patent: Dec. 16, 2014

(54) METHODS FOR MANUFACTURING A COMPOSITE FAN INLET HOUSING

(75) Inventors: William H. Doddman, Phoenix, AZ (US); Robert Saunders Murray, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 299 days.

(21) Appl. No.: 13/344,791

(22) Filed: Jan. 6, 2012

(65) Prior Publication Data

US 2013/0175731 A1 Jul. 11, 2013

(51) Int. Cl.
*B28B 7/32* (2006.01)

(52) U.S. Cl.
USPC ........ 264/314; 264/45.1; 264/46.5; 264/45.2; 264/46.6; 264/50; 264/321; 264/415; 264/241; 264/261; 264/263

(58) Field of Classification Search
USPC ............ 264/45.1, 45.2, 46.5, 46.6, 50, 314, 264/321, 415
See application file for complete search history.

(56) References Cited

U.S. PATENT DOCUMENTS

| | | | | |
|---|---|---|---|---|
| 4,202,856 | A | * | 5/1980 | Frikken et al. ............... 264/221 |
| 5,547,629 | A | * | 8/1996 | Diesen et al. ............... 264/257 |
| 6,500,379 | B1 | | 12/2002 | Wrobbel |
| 2003/0069321 | A1 | * | 4/2003 | Lin et al. ..................... 521/159 |
| 2006/0134396 | A1 | * | 6/2006 | Blanton et al. ............ 428/292.1 |
| 2007/0203300 | A1 | | 8/2007 | Sumi et al. |
| 2010/0061858 | A1 | | 3/2010 | Jones |
| 2010/0266416 | A1 | * | 10/2010 | Marshall et al. ............. 416/226 |

FOREIGN PATENT DOCUMENTS

GB 2273131 A 6/1994
GB 2410921 A 8/2005

OTHER PUBLICATIONS

EP search report for Application No. EP 13 150 075.3 dated Apr. 24, 2013.

* cited by examiner

*Primary Examiner* — Jeffrey Wollschlager
*Assistant Examiner* — Stella Yi
(74) *Attorney, Agent, or Firm* — Ingrassia Fisher & Lorenz, P.C.

(57) ABSTRACT

Methods for manufacturing a composite fan inlet housing are disclosed. The methods include inserting a first piece of composite material and a second piece of composite material into a molding tool, inserting an inflatable bladder between the first piece and the second piece, and pressurizing the inflatable bladder to a curing pressure for a length of time sufficient to allow the first piece and second piece to cure.

19 Claims, 10 Drawing Sheets

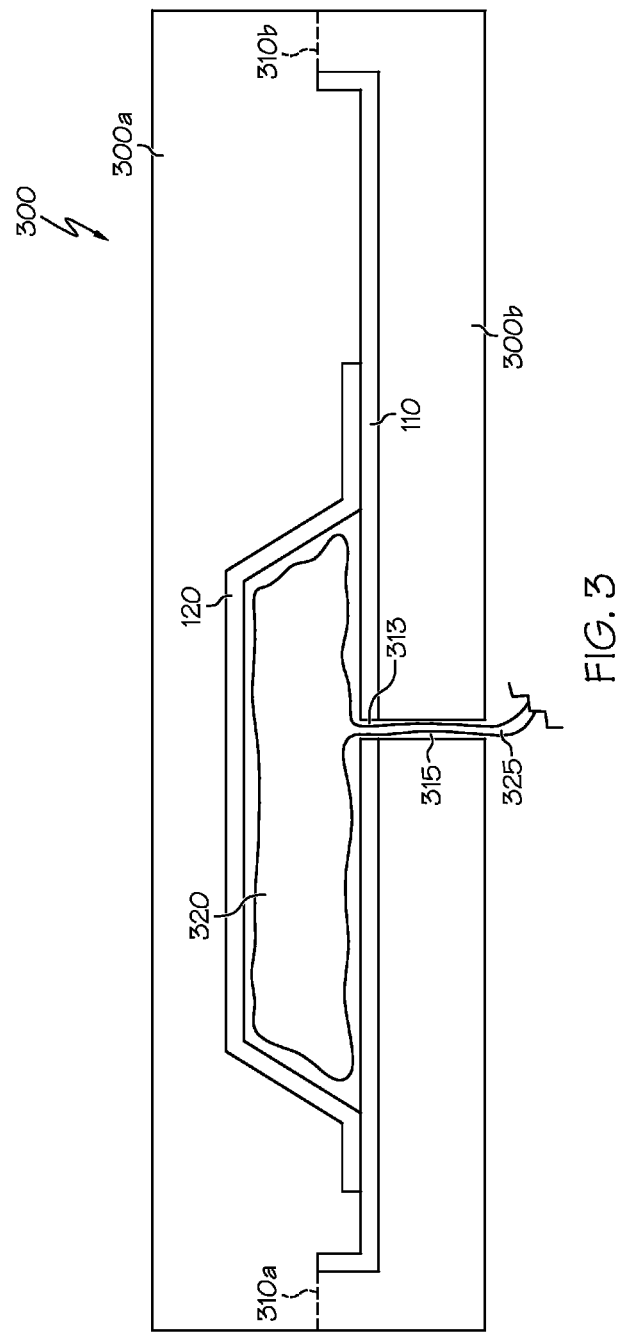

METHODS FOR MANUFACTURING A COMPOSITE FAN INLET HOUSING

TECHNICAL FIELD

This disclosure relates generally to turbine engines, and more particularly to methods for manufacturing composite inlet housings used with turbine engines.

BACKGROUND

Gas turbine engines typically include high and low pressure compressors, a combustor, and at least one turbine. The compressors compress air, which is mixed with fuel and channeled to the combustor. The mixture is then ignited and generates hot combustion gases. The combustion gases are channeled to the turbine which extracts energy from the combustion gases for powering the compressor, as well as producing useful work to propel an aircraft in flight or to power a load, such as an electrical generator. In the instance of an aircraft engine, the useful work may take the form of a jet exhaust stream. Alternatively, the turbine may power a propeller or a fan.

Though highly unlikely, it is postulated that a fan blade in the turbine engine may become damaged and tear loose from the rotor during operation. It is further postulated that this unlikely event would cause the damaged fan blade to pierce the surrounding engine housing, which may result in cracks along the exterior surface of the engine housing. To alleviate concerns associated with a postulated fan blade separation event, at least some known engines are assembled with an inlet housing shell that increases the radial and axial stiffness of the engine and that reduces stresses near the engine housing penetration.

Known fan inlet housing assemblies include a double-walled structure. The primary and secondary walls are typically separated by a distance of one or more inches, depending on the size of the engine, in order to provide structural redundancy. Some existing fan inlet housings include either an aluminum alloy or a graphite epoxy composite material for the primary wall, a graphite epoxy composite material for the secondary wall, and a low density honeycomb or foam core material to effect load transfer between the walls. In these housings, the core is typically arranged between the walls in a "sandwich" configuration.

FIGS. 1a and 1b depict an example double-walled assembly 100 (FIG. 1a is provided in axial cross-section with respect to the engine housing, and FIG. 1b is provided in radial cross-section). The primary wall 110 extends axially to a length $L_1$. The length $L_1$ is dependent on the size of the engine, and can readily be selected by a person of ordinary skill in the art. In some implementations, the length $L_1$ can range from approximately 8 inches to approximately 36 inches, although smaller and larger lengths are possible. The primary wall 110 includes two flanges 111a,111b located at each axial end thereof. The flanges 111a,111b are oriented generally perpendicularly with respect to the axial length of the wall 110. Adjoined to the primary wall 110 is the secondary wall 120. The secondary wall 120 extends axially along the length of the primary wall 110 at a length $L_2$, which is less than $L_1$, and can range from approximately 4 inches to approximately 18 inches, although smaller and larger lengths are possible. The secondary wall 120 can be a generally trapezoidal shape, having flanges 121a,121b oriented parallel to primary wall 110 for adhesively adjoining the secondary wall 120 thereto. The secondary wall has a width $W_1$, which can typically range from approximately 1 to 3 or more inches, depending on the strength characteristics desired. Positioned ("sandwiched") between the primary wall 110 and the secondary wall 120 is a honeycomb or foam material core layer 130.

To fabricate the assembly 100, in the past, the graphite epoxy composite wall structures 110,120 were molded under high pressure (for example, approximately 50-100 psi was a typical molding pressure) to achieve the desired properties (strength, load transfer, etc.). In practice, it was observed that high molding pressure caused the low density core 130 to collapse, so the individual walls 110,120 were molded separately, and then assembled to the core 130 using an adhesive. The process was labor-intensive and had an undesirably high fabrication cost.

With reference to FIGS. 2a and 2b, the current state of the art typically employs a three-step process (illustrated as process flow chart 200a in FIG. 2a and as schematic flow diagram 200b in FIG. 2b). First, at step 201a,201b, the primary wall 110 is fabricated as a separate detail by high pressure molding, using mold 140, if a composite material is used or by machining if a metal material is used. Second, at step 202a, 202b, an adhesive 125 is applied to bond the low-density core 130 to the primary wall 110. Third, at step 203a,203b, in-situ fabrication techniques are employed to shape the secondary wall 120 directly to the core 130 and primary wall 110 using low pressure molding (arrows 122). For example, approximately 10-15 psi is a typical molding pressure, to avoid collapse of the low density core. This approach results in less than optimal properties in the secondary wall (as compared to past techniques where both were high-pressure molded, then adhered to the core), but somewhat reduces fabrication complexity and therefore cost. As such, there is currently a trade-off between material properties and fabrication cost.

In an alternative process, a high-density core material could be used, thereby allowing for high-pressure molding to achieve the desired wall characteristics. However, in many applications, high-density core materials add an unacceptable amount of weight to the housing, and are therefore impractical.

Therefore, what is needed in the art is an improved method for manufacturing a composite fan inlet housing that achieves optimal material properties, including high strength and low weight, while maintaining a low cost of fabrication.

BRIEF SUMMARY

Methods are provided for manufacturing a composite inlet housing. In accordance with one embodiment, a method includes inserting a first piece of composite material and a second piece of composite material into a molding tool, inserting an inflatable bladder between the first piece and the second piece, pressurizing the inflatable bladder to a curing pressure for a length of time sufficient to allow the first piece and second piece to cure, optionally removing the inflatable bladder from the molding tool, and injecting foam between the cured first piece and second piece. The composite material may be configured in a redundant structure to minimize damage caused by the impact of a fan blade separated from a rotating turbine shaft.

In accordance with a further embodiment, a method includes inserting a first piece of composite material and a second piece of composite material into a molding tool, inserting a multi-segment, connected inflatable bladder between the first piece and the second piece, inserting additional composite material between the segments of the multi-segment, connected inflatable bladder; and pressurizing the inflatable bladder to a curing pressure for a length of time sufficient to allow the first piece, the second piece, and the additional composite material to cure.

In accordance with yet another embodiment, a method includes inserting a first piece of composite material and a second piece of composite material into a molding tool, inserting an inflatable bladder between the first piece and the second piece, and pressurizing the inflatable bladder to a curing pressure for a length of time sufficient to allow the first piece and second piece to cure.

BRIEF DESCRIPTION OF THE DRAWINGS

The present disclosure will hereinafter be described in conjunction with the following drawing figures, wherein like numerals denote like elements, and wherein:

FIG. 2b (prior art) depicts a process diagram in accordance with the flow chart of FIG. 2a;

FIG. 3 depicts an apparatus for manufacturing a double-walled fan inlet housing in accordance with one embodiment of the invention;

FIG. 4b depicts a process diagram in accordance with the flow chart of FIG. 4a;

FIG. 6b depicts a process diagram in accordance with the flow chart of FIG. 6a.

DETAILED DESCRIPTION

Figure 1A:
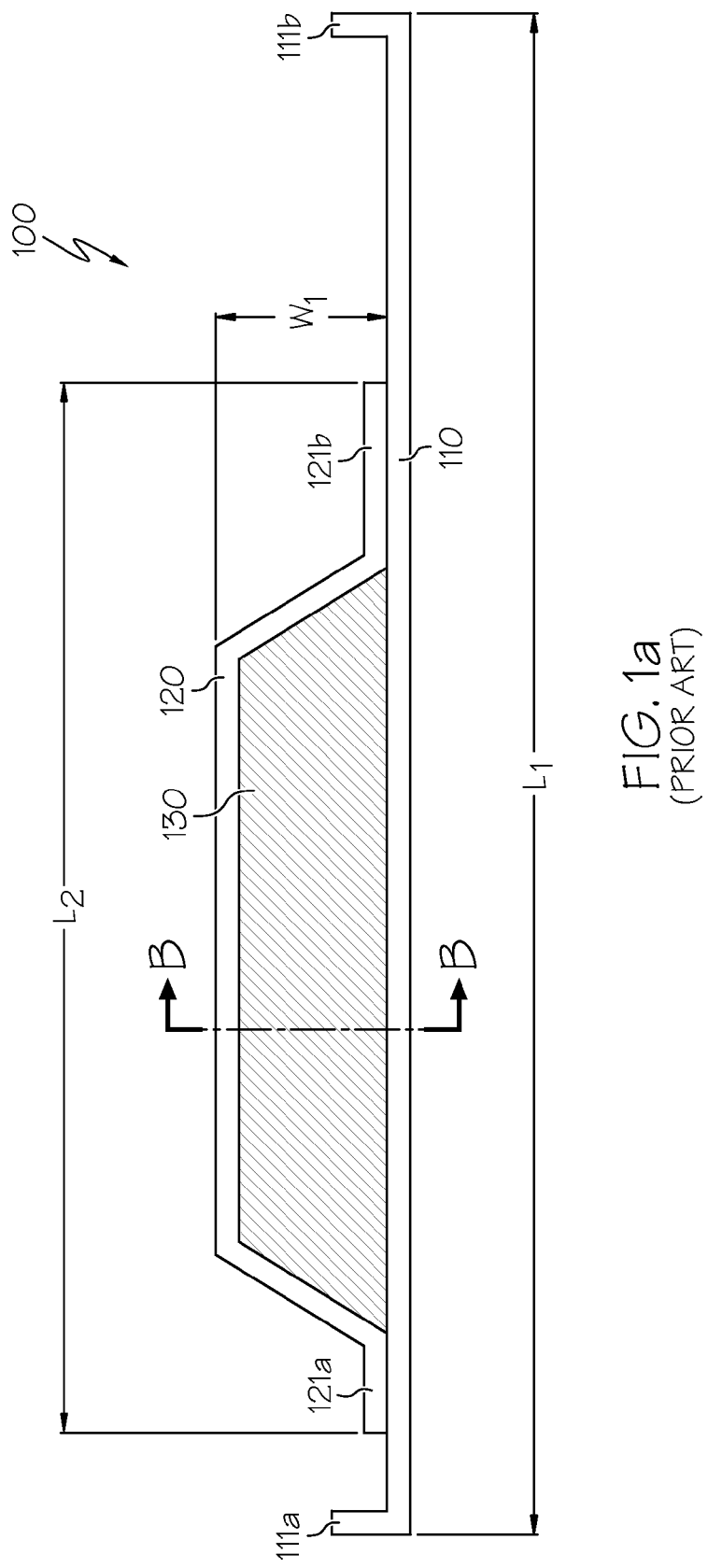
FIG. 1a (prior art) depicts a double-walled fan inlet housing in axial cross-section.
Figure 1B:
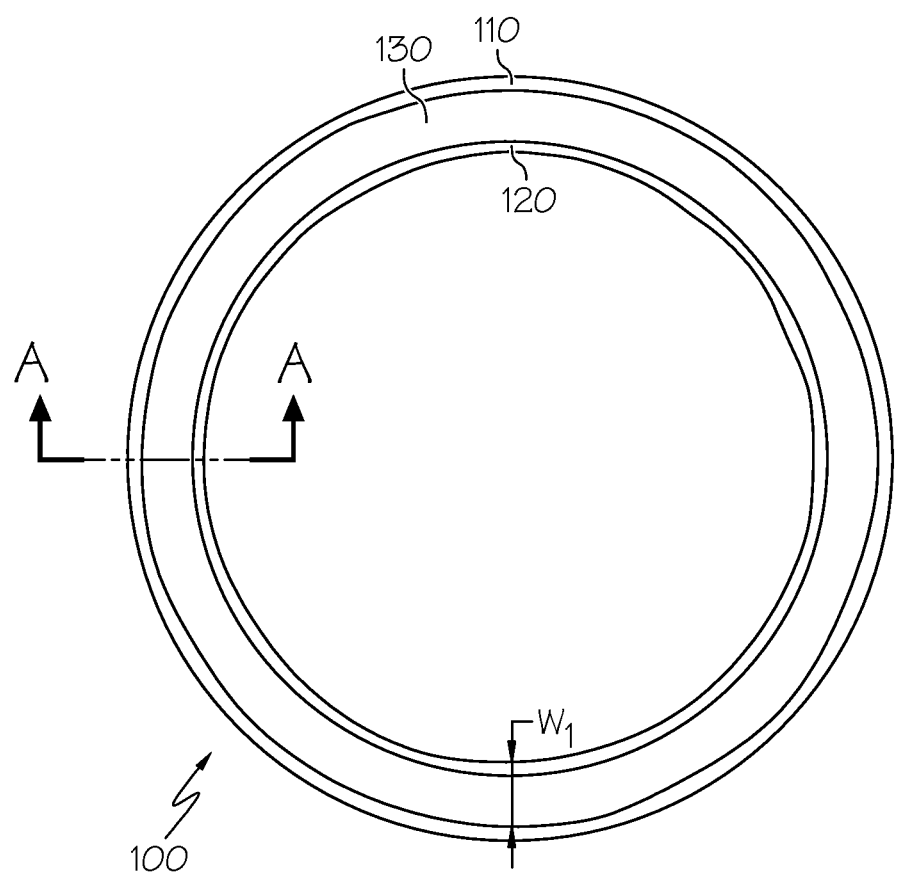
FIG. 1b (prior art) depicts the double-walled fan inlet housing of FIG. 1a in radial cross-section.
Figure 2A:
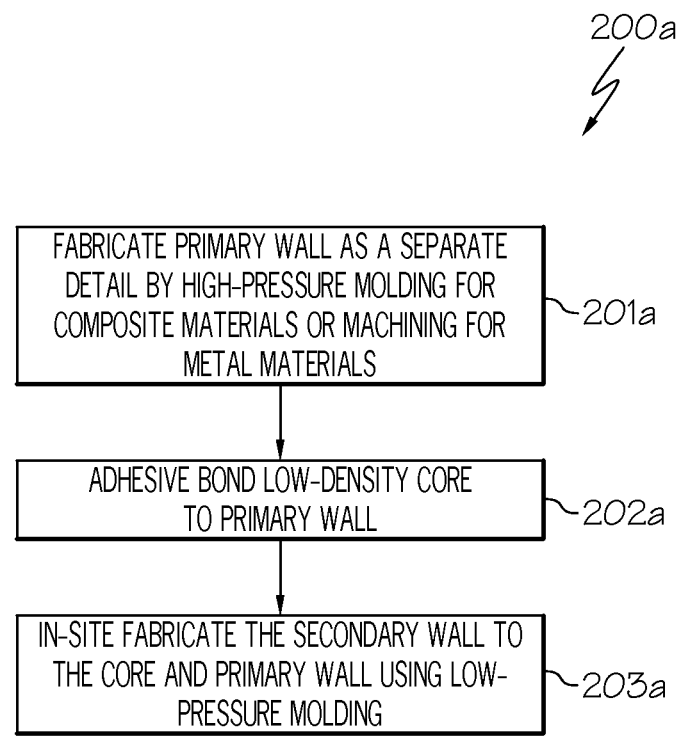
FIG. 2a (prior art) depicts a process flow chart for manufacturing a double-walled fan inlet housing.
Figure 2B:
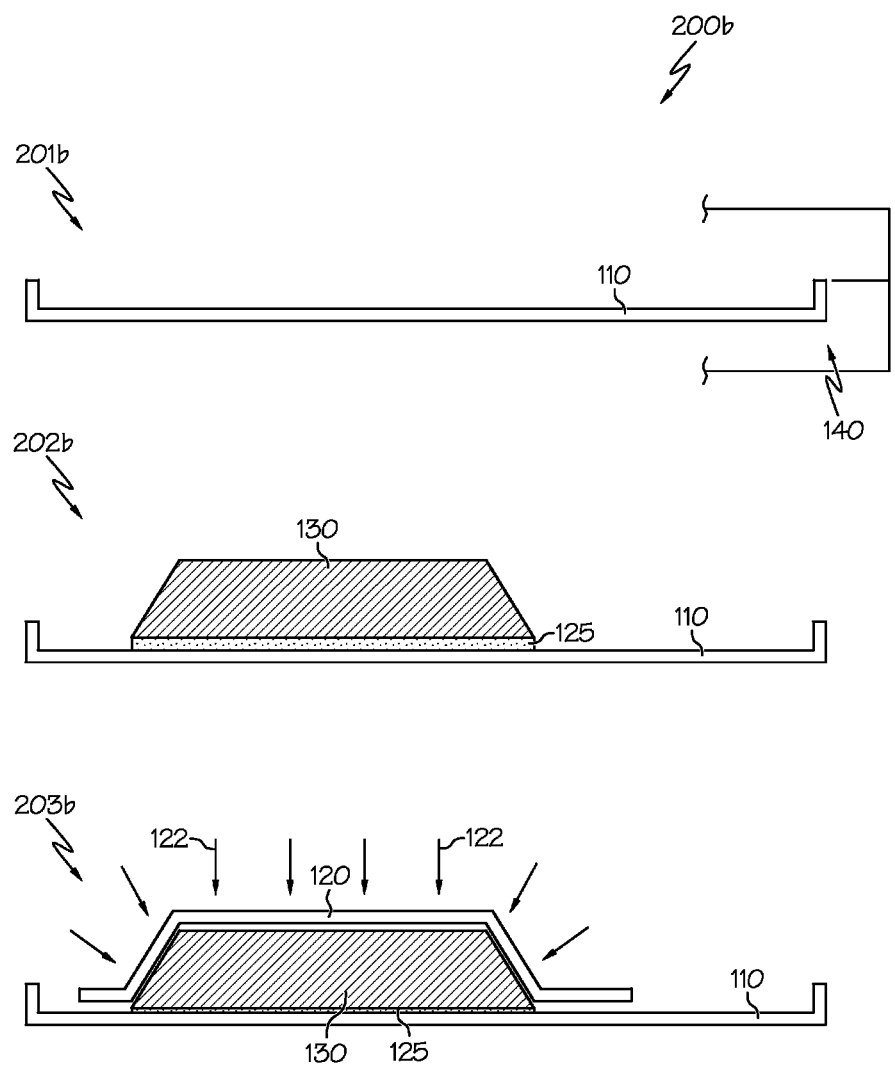

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

This disclosure, described with reference to the embodiments detailed hereafter, includes methods for high-pressure molding both walls of a double-walled composite fan inlet housing as a single structure in one process step. A fully enclosed space or cavity is reserved for the insertion of a low-density core material. The low density core material is installed in the cavity in a separate step after completion of the molding process. In variations of the described methods, the composite material that forms the double-walled structure can also be used to form in situ shear webs, in which case the low density core material can be omitted.

FIG. 3 depicts an example apparatus for use in one embodiment of a method for forming a double-walled fan inlet housing. The apparatus includes a molding tool 300 having an upper piece 300a and a lower piece 300b. The pieces 300a, 300b are brought into abutting contact along lines 310a, 310b, and form a cavity in the general shape of the double-walled housing structure. An inflatable, flexible bladder 320 is inserted within the cavity, the bladder having a fill tube portion 325 that extends through a channel 315 in the lower piece 300b. The bladder 320 can be inflated with a fluid, for example, air. In between the bladder 320 and the molding tool 300, a graphite epoxy composite material is provided in two pieces to form the primary wall 110 and the secondary wall 120, as shown in FIG. 3. While the graphite epoxy composite material is mentioned herein as a suitable material for forming the walls 110,120, the present invention is not limited to any particular composite material, and it is expected that those having ordinary skill in the art will be able to select a suitable composite material for use in particular applications. A gap 313, also referred to as a bladder fill port, remains in the primary wall 110 coterminous with the channel 315 to allow the bladder fill tube 325 to pass therethrough.

Figure 4A:
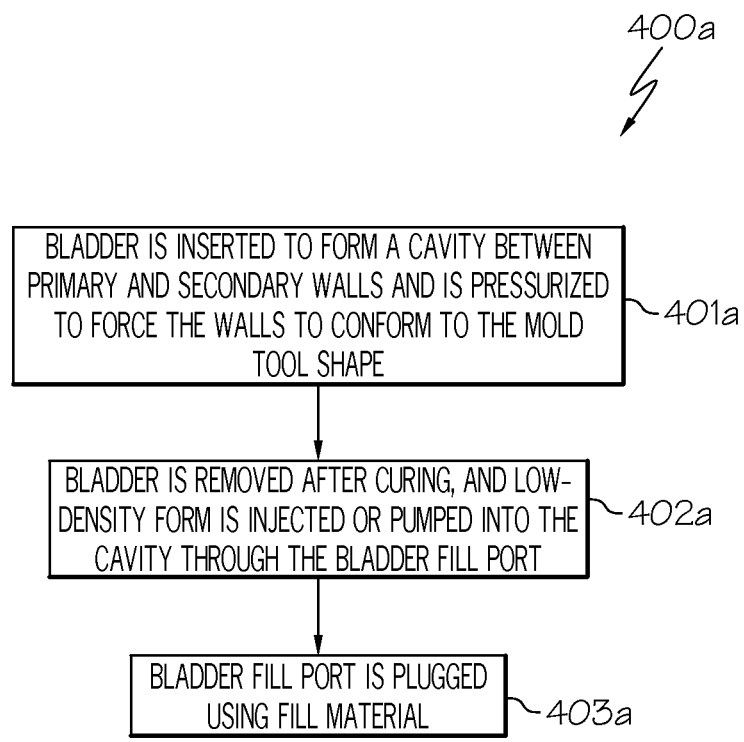
FIG. 4a depicts a process flow chart for manufacturing a double-walled fan inlet housing using the apparatus of FIG. 3.
Figure 4B:
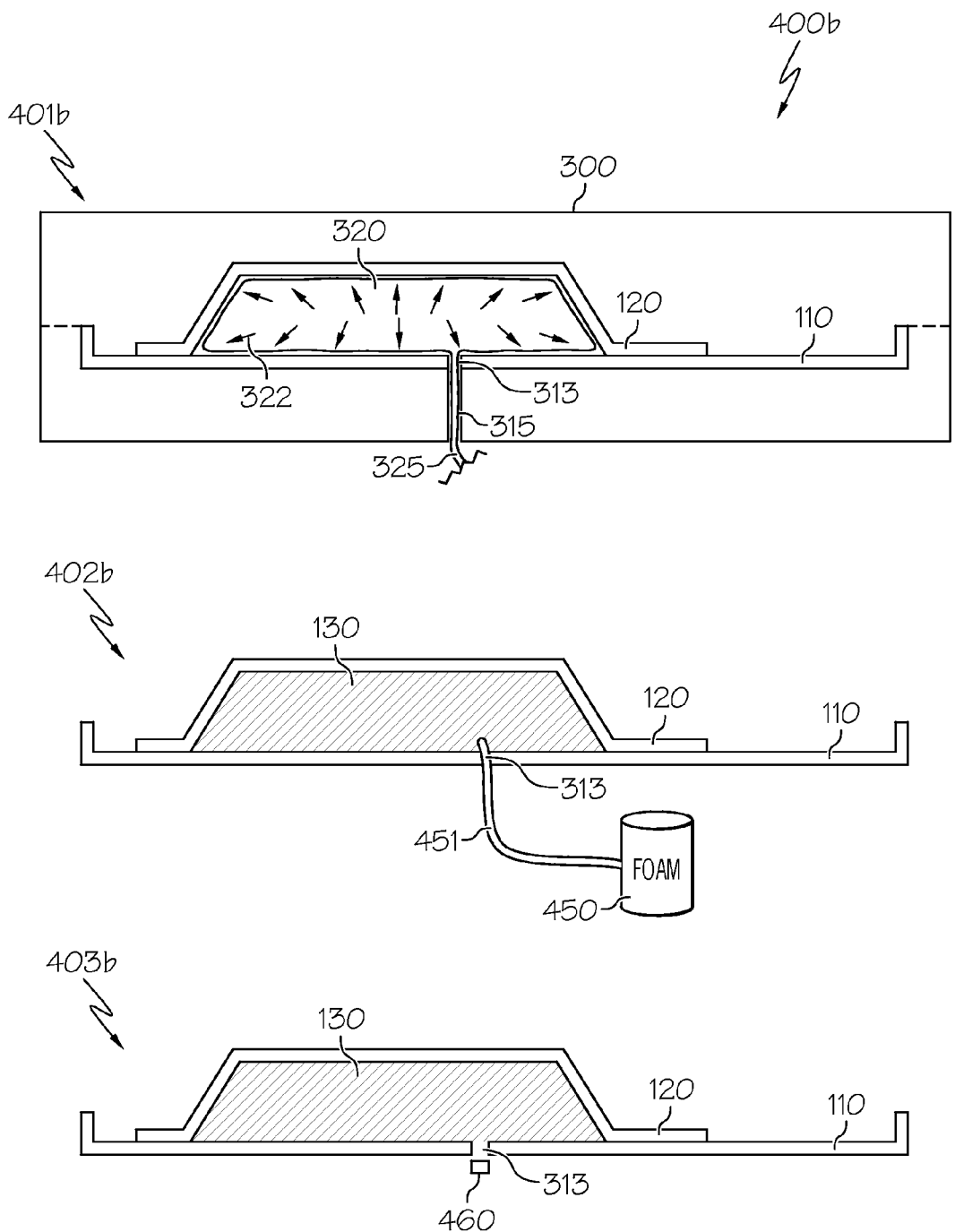

FIGS. 4a and 4b depict an example process flow chart 400a and process diagram 400b, respectively, for use with the apparatus described above in FIG. 3. At step 401a,401b, with the molding tool 300 in the closed position (upper piece 300a and lower piece 300b brought into abutting contact, as shown), the bladder 320 is inserted between the primary wall 110 composite material piece and the secondary wall 120 composite material piece to form a cavity between the two pieces. Alternatively, the bladder 320 may be positioned with the composite material piece prior to closure of the tool. The bladder 320 is pressurized (arrows 322) to force the walls 110,120 to conform to the molding 300 tool shape, i.e., the desired shape of the double-walled fan inlet housing. The bladder 320 can be pressurized to a relatively high pressure for curing (as compared to pressures previously used to protect low-density foams from collapsing), for example, approximately 50-100 psi, to ensure the desired characteristics, without fear of collapsing the low-density core, as the low-density core has not yet been put in place. It is also noted that the curing process involves the use of elevated temperatures, for example, approximately 200-300 degrees Fahrenheit. Curing is generally accomplished in about one, two, or more hours at the elevated temperature and pressure.

At step 402a,402b, the bladder 320 is depressurized and optionally removed after curing is complete, and a low-density foam material 130 is injected or pumped into the empty cavity through the bladder fill port 313. Where the bladder 320 is removed, it is selected from a material or treated such that it will release from the molded composite material. Where the bladder 320 is not removed, the bladder remains in place and become a functional element of the structure, and is selected from a material or treated such that it will adhere to the molded composite material. The foam material 130 can be provided in liquid form from a foam container 450 and through a foam-filling tube 451 connected to the container 450. In one example, the foam is a polypropylene (PP) or a polyurethane (PU) foam. The invention is not limited to any particular type of foam; rather, it is expected that those having ordinary skill in the art will easily be able to select a suitable foam material having the desired density properties for the particular application. The foam is then allowed to set.

At step 403a,403b, the foam-filling tube 451 has been removed, and the bladder fill port 313 is optionally plugged using a plug 460 that can be made of a fill material, for example, the same graphite epoxy composite material as the walls 110,120. Adhesive may be required to ensure secure placement of the plug 460.

Figure 5:
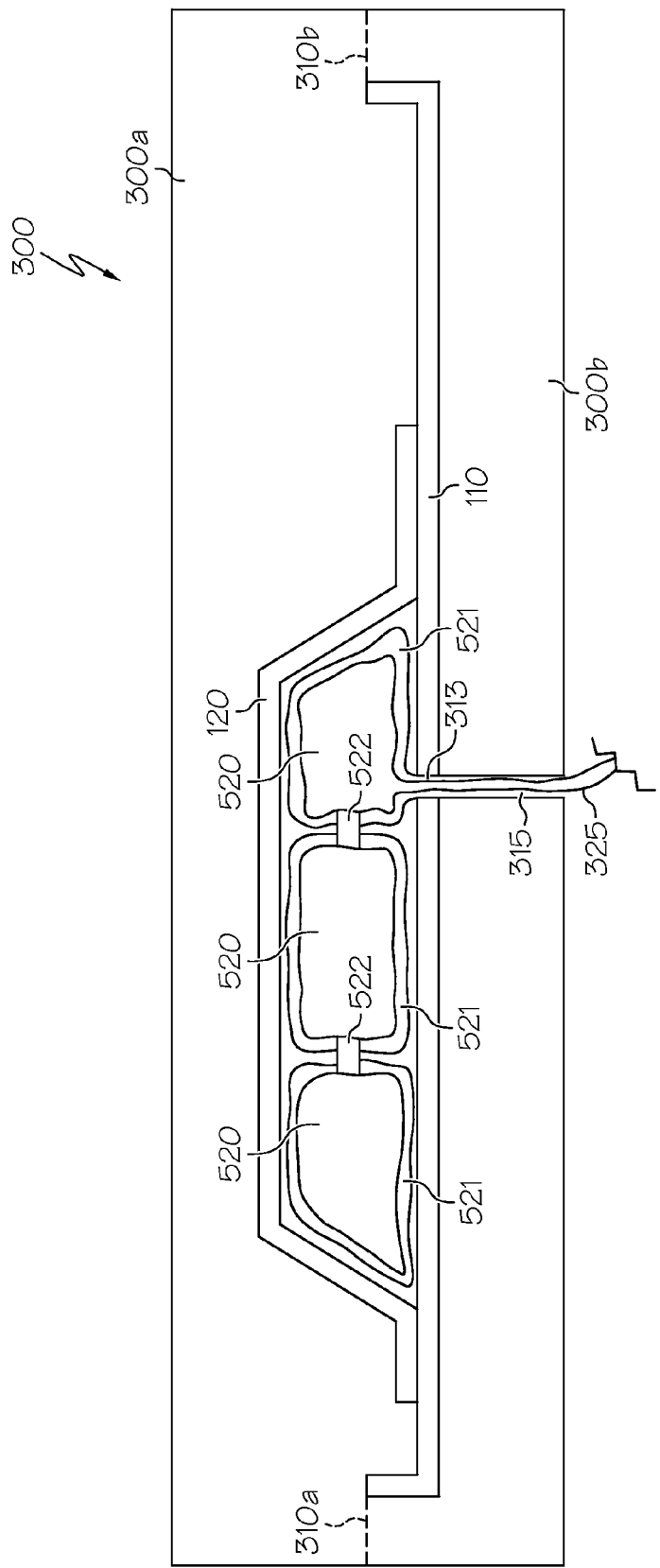
FIG. 5 depicts an apparatus for manufacturing a double-walled fan inlet housing in accordance with another embodiment of the invention.

FIG. 5 depicts an example apparatus for use in another embodiment of a method for forming a double-walled fan inlet housing. In this embodiment, the molding tool configuration is generally the same as discussed above with regard to FIG. 3. However, a multi-segment, connected bladder is provided having bladder segments 520 (three are shown in this example, however two, three, four, or more segments may be provided in variations of this embodiment) that are fluidly and hermetically connected to one another with connection portions 522. The segments 520 can be arranged either circumferentially or axial to suit the desired web geometry. The bladder fill tube 325 allows fluid (e.g., air) to enter into a first bladder segment 520, and the fluid can flow into the additional connected segments 520 through the connection portions 522. The multi-segment, connected bladder can be pressurized to the same relatively high pressure to allow for high-pressure molding operations. Furthermore, the individual segments 520 are surrounded with additional graphite epoxy composite material 521, or other suitable composite material. The additional composite material 521, when cured, forms walls within the cavity for providing the same load transfer between walls 110,120 as the foam did in the previous embodiment. In this embodiment, the bladder segments 520 remain in-place as the composite material 521 cures, thereby also forming part of the cavity walls.

Figure 6A:
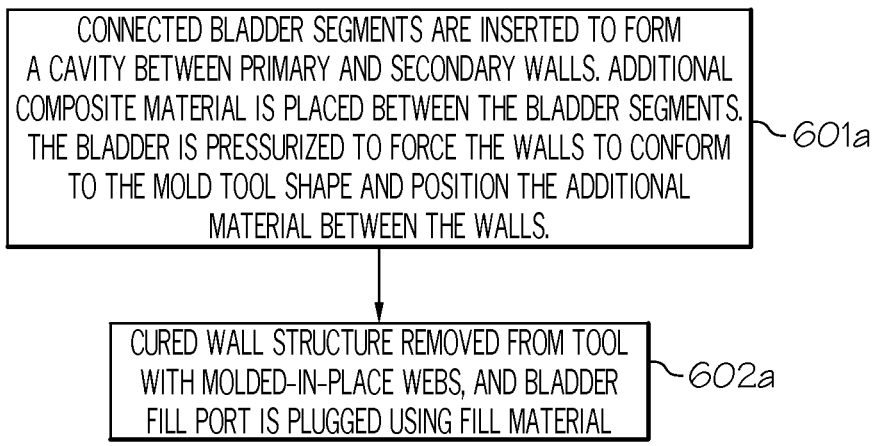
FIG. 6a depicts a process flow chart for manufacturing a double-walled fan inlet housing using the apparatus of FIG. 5.
Figure 6B:
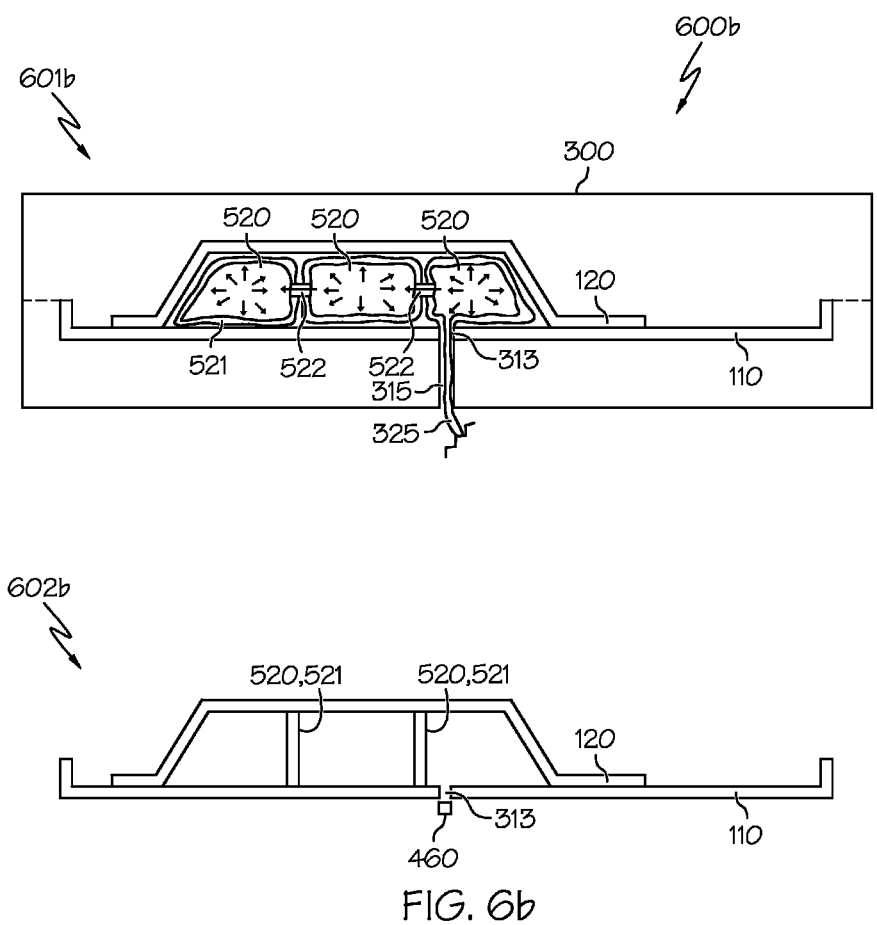

FIGS. 6a and 6b depict an example process flow chart 600a and process diagram 600b, respectively, for use with the apparatus described above in FIG. 5. At step 601a,601b, with the molding tool 300 in the closed position, the connected bladder segments 520 are inserted in the desired arrangement between the primary wall 110 and the secondary wall 120 composite material pieces. Alternatively, the bladder segments 520 may be positioned with the composite material piece prior to closure of the tool. The connected bladder segments 520 are pressurized to force the walls 110,120 to conform to the molding tool 300 shape, i.e., the desired shape of the double-walled fan inlet housing, and form the cavity. Further, in this embodiment, the additional composite material 521 between the segments is forced into a generally perpendicular (with respect to walls 110,120) shear web within the cavity. Elevated temperatures and pressures are used in the curing process as described above.

At step 602a,602b, the cured inlet housing structure (including primary and secondary walls 110,120, and the perpendicular load transfer webs made of the bladder segments 520 that remain in place and the additional composite material 521) is removed from the molding tool 300. No foam is added. The components 520,521 within the cavity form a molded-in-place (in situ) shear web that is designed to afford the double-walled structure similar strength and load transfer characteristic as if foam had been used, but without the need to add foam in an additional step. Also, the bladder fill port 313 can optionally be plugged using the plug 460, as above.

The embodiments presented in this disclosure allow a double-walled fan inlet housing to be manufactured using high-pressure molding in a simple process that avoids the cumbersome and costly fabrications processes used previously. Furthermore, embodiments of the present disclosure allow for various combinations of relatively light-weight materials (graphite/epoxy walls, low density foams, etc.) to be used to suit the particular needs of the implementation while maintaining the desired material properties.

While at least one exemplary embodiment has been presented in the foregoing detailed description, it should be appreciated that a vast number of variations exist. It should also be appreciated that the exemplary embodiments are only examples, and are not intended to limit the scope, applicability, or configuration of the invention in any way. Rather, the foregoing detailed description will provide those skilled in the art with a convenient road map for implementing the exemplary embodiments. It should be understood that various changes can be made in the function and arrangement of elements without departing from the scope of the invention as set forth in the appended claims and the legal equivalents thereof.

What is claimed is:

1. A method of manufacturing a composite fan inlet housing, comprising:
    inserting a first piece of composite material and a second piece of composite material into a molding tool;
    inserting an inflatable bladder between the first piece and the second piece;
    pressurizing the inflatable bladder to a curing pressure for a length of time sufficient to allow the first piece and second piece to cure; and
    injecting foam between the cured first piece and second piece.

2. The method of claim 1, wherein the composite material is configured in a redundant structure to minimize damage caused by the impact of a fan blade separated from a rotating turbine shaft.

3. The method of claim 2, wherein the composite material is a graphite epoxy material.

4. The method of claim 1, wherein the curing pressure is between about 50 psi and 100 psi.

5. The method of claim 1, further comprising removing the inflatable bladder from the molding tool prior to injecting foam between the cured first piece and second piece.

6. The method of claim 1, wherein the foam is a low-density foam.

7. The method of claim 6, wherein the foam is a low-density polyurethane or a low-density polypropylene foam.

8. The method of claim 1, wherein the bladder is pressurized and the foam is injected through a gap in one of either the first piece or the second piece.

9. The method of claim 8, further comprising inserting a plug in the gap after the foam has been injected.

10. A method of manufacturing a composite fan inlet housing, comprising:
    inserting a first piece of composite material and a second piece of composite material into a molding tool;
    inserting a multi-segment, connected inflatable bladder between the first piece and the second piece;
    inserting additional composite material between the segments of the multi-segment, connected inflatable bladder; and
    pressurizing the inflatable bladder to a curing pressure for a length of time sufficient to allow the first piece, the second piece, and the additional composite material to cure.

11. The method of claim 10, wherein the multi-segment, connected inflatable bladder comprises two or more segments.

12. The method of claim 10, wherein the segments of the multi-segment, connected inflatable bladder are fluidly and hermetically connected with connection portions positioned between the segments.

13. The method of claim 10, wherein the multi-segment, connected inflatable bladder is left in place after curing is completed.

14. The method of claim 13, wherein the cured additional composite material and the multi-segment, connected inflatable bladder form a molded-in-place web.

15. The method of claim 14, wherein the molded-in-place web provides load transfer between the cured first and second pieces.

16. The method of claim 14, wherein the molded-in-place web is a series of walls between the cured first and second pieces oriented generally perpendicular to the cured first and second pieces.

17. The method of claim 10, wherein the multi-segment, connected inflatable bladder is inserted in either an axial or circumferential arrangement.

18. The method of claim 10, wherein no foam is inserted between the first and second piece after curing.

19. The method of claim 10, wherein the fan inlet housing is a double-walled structure.

* * * * *